(12) United States Patent
Yu et al.

(10) Patent No.: US 10,995,764 B2
(45) Date of Patent: May 4, 2021

(54) CROSS-FLOW TYPE FLOW-MAKING WATER PUMP

(71) Applicants: Youkai Yu, Chaozhou (CN); Bingyan Yu, Chaozhou (CN); Jianqin Yu, Chaozhou (CN)

(72) Inventors: Youkai Yu, Chaozhou (CN); Bingyan Yu, Chaozhou (CN); Jianqin Yu, Chaozhou (CN)

(73) Assignee: GUANGDONG BOYU GROUP CO., LTD., Guangdong (CN)

( * ) Notice: Subject to any disclaimer, the term of this patent is extended or adjusted under 35 U.S.C. 154(b) by 252 days.

(21) Appl. No.: 16/067,358

(22) PCT Filed: Dec. 28, 2016

(86) PCT No.: PCT/CN2016/112513
§ 371 (c)(1),
(2) Date: Jun. 29, 2018

(87) PCT Pub. No.: WO2017/114402
PCT Pub. Date: Jul. 6, 2017

(65) Prior Publication Data
US 2019/0014755 A1  Jan. 17, 2019

(30) Foreign Application Priority Data
Dec. 30, 2015 (CN) .......................... 201521139538.7

(51) Int. Cl.
*A01K 63/04* (2006.01)
*F04D 29/20* (2006.01)
(Continued)

(52) U.S. Cl.
CPC .............. *F04D 29/20* (2013.01); *F04D 5/00* (2013.01); *F04D 13/086* (2013.01); *F04D 13/12* (2013.01);
(Continued)

(58) Field of Classification Search
CPC ..... A01K 63/047; F04D 13/086; F04D 13/12; F04D 29/20; F04D 29/628; F04D 5/00; H02K 7/003
See application file for complete search history.

(56) References Cited

U.S. PATENT DOCUMENTS 4,247,265 A  1/1981  Cavalcante
4,890,982 A *  1/1990  Riback ................... F04D 29/20
                                             416/134 R
(Continued)

FOREIGN PATENT DOCUMENTS

CN        1533014       9/2004
CN      203743014       7/2014
(Continued)

*Primary Examiner* — Dominick L Plakkoottam
(74) *Attorney, Agent, or Firm* — McNees Wallace & Nurick LLC

(57) ABSTRACT

A cross-flow type flow-making water pump is provided, including a motor, two impeller and impeller housings. The cross-flow type flow-making water pump further includes clamping assemblies. The clamping assemblies are used for connecting the motor with the impellers. The clamping assemblies include clamping heads and clamping seats. The clamping heads are arranged at the ends, which are connected with motor rotating shaft, of the impellers. The clamping heads include at least two clamping sheets symmetrically arranged along axial directions of the impellers. The clamping seats are respectively arranged on the motor rotating shaft in a sleeving manner. Connection between the motor rotating shaft and the impellers is realized through clamping of the clamping sheets and the clamping seats.

13 Claims, 10 Drawing Sheets

(51) Int. Cl.
*F04D 13/08* (2006.01)
*H02K 7/14* (2006.01)
*F04D 13/12* (2006.01)
*H02K 1/32* (2006.01)
*F04D 5/00* (2006.01)
*H02K 5/12* (2006.01)
*H02K 7/00* (2006.01)
*F04D 29/62* (2006.01)
*H02K 5/132* (2006.01)

(52) U.S. Cl.
CPC .................. *H02K 1/32* (2013.01); *H02K 5/12* (2013.01); *H02K 7/003* (2013.01); *H02K 7/14* (2013.01); *A01K 63/047* (2013.01); *F04D 29/628* (2013.01); *H02K 5/132* (2013.01)

(56) References Cited

U.S. PATENT DOCUMENTS

| | | | | |
|---|---|---|---|---|
| 6,254,349 | B1* | 7/2001 | Haugen | F04D 29/266 415/216.1 |
| 6,523,498 | B1* | 2/2003 | Shyu | A01K 63/042 119/259 |
| 8,376,701 | B2* | 2/2013 | Svendsen | F04D 29/044 415/216.1 |
| 8,943,667 | B2* | 2/2015 | Ivinson | B23P 11/02 29/505 |
| 9,828,999 | B2* | 11/2017 | Andersson | F04D 15/0033 |
| 9,901,719 | B2* | 2/2018 | Gotou | A61M 25/1029 |
| 2015/0292507 | A1* | 10/2015 | Liang | F04D 29/043 415/88 |

FOREIGN PATENT DOCUMENTS

| | | |
|---|---|---|
| CN | 204458369 | 7/2015 |
| CN | 205260343 | 5/2016 |
| CN | 205533282 | 8/2016 |
| CN | 205578288 | 9/2016 |

\* cited by examiner

CROSS-FLOW TYPE FLOW-MAKING WATER PUMP

CROSS-REFERENCES TO RELATED APPLICATIONS

This application is a national stage application under 35 U.S.C. 371 based on international patent application PCT/CN2016/112513, filed on Dec. 28, 2016, which claims priority to a Chinese patent application No. 201521139538.7, filed on Dec. 30, 2015, a Chinese patent application No. 201620100460.6, filed on Feb. 1, 2016 and a Chinese patent application No. 201620408887.2, filed on May 6, 2016, disclosures of which are incorporated herein by reference in their entireties.

TECHNICAL FIELD

The present disclosure relates to the technical field of flow-making pumps, and for example, to a cross-flow type flow-making water pump.

BACKGROUND

A cross-flow type flow-making water pump in a related art functions to enable water in an aquarium to "rotate" to simulate and create a natural water flow to enable water flows of different water layers in the aquarium to be uniform without forming a dead water zone. In an aquarium with a filter pump, a water flow impact occurs in a water drainage region, but such phenomena that floating objects in water are static and garbage and sediments are stacked may occur in other regions. At this time, if a cross-flow type flow-making water pump in the related art is added into a specific region of the aquarium, the water in the aquarium can form a clockwise rotating water flow, and the sediments deposited in a static water region can be gathered to a water suction opening along with a subterranean flow, and then are sucked and filtered, thereby treating the water through filtering more effectively.

However, in most of the related art, an impeller and a motor rotating shaft are connected in an interference fit manner or fixedly connected through glue, or the motor rotating shaft is connected with a ceramic shaft through a shaft coupler, and then the ceramic shaft is directly connected with the impeller. After the pump is used for a period of time, a clearance is produced by wearing the motor rotating shaft and a hole of the impeller, resulting in unstable rotation of the impeller. Meanwhile, the rotating speed of the impeller is also reduced, so that an original predetermined flow-making effect cannot be achieved, and noise is increased. A user cannot remove the impeller for cleaning if foreign matters enter the impeller.

The impeller in the related art is generally formed by plugging/adhering a front end and a rear end, and meanwhile, the front end and the rear end which are plugged/or adhered are not exactly the same in shapes. Therefore, it requires distinguishing the front end and the rear end of the impeller in an assembling process of the impeller to prevent such a phenomenon that subsequent installation cannot be continued in an entire installation process of the flow-making water pump.

However, the cross-flow type flow-making water pump in the related art can only manufacture water flows, and cannot fill the water with oxygen, so that the user generally needs to equip an oxygen enrichment pump in the aquarium to guarantee sufficient oxygen for aquatic creatures in the aquarium, thereby increasing the economic cost. Meanwhile, through the additional arrangement of the oxygen enrichment pump, pipes in the aquarium can be easily increased, thereby affecting the aesthetic sense in the aquarium.

SUMMARY

The present disclosure provides a cross-flow type flow-making water pump, which can solve the problems that wear between a motor rotating shaft and the impellers occurs, and the flow-making water pump is difficult to disassemble and clean due to direct connection between motor rotating shaft and impellers. The present disclosure adopts the following technical solution.

A cross-flow type flow-making water pump includes: a motor housing; a motor arranged inside the motor housing; two impeller housings; two impellers respectively arranged at both ends of the motor and respectively located inside the two impeller housings; and two clamping assemblies for connecting the motor with the two impellers respectively, each of the clamping assemblies comprise a clamping head and a clamping seat; and the clamping head is arranged at one end of the impellers, which are connected with a motor rotating shaft; and the clamping head comprises at least two clamping sheets symmetrically arranged along an axial direction of the impellers; and the clamping seat is arranged around each of the motor rotating shaft in a sleeving manner, and the motor rotating shaft and the impellers are connected through clamping of the clamping sheets and the clamping seat.

Optionally, insertion grooves are formed in a periphery of the clamping seat along a axial direction of the clamping seat, and the clamping sheets are inserted into the insertion grooves.

Optionally, an end portion of one of the clamping sheets is provided with a clamping hook extending in an inward manner along a radial direction of a respective one of the impellers to prevent the one of the clamping sheets from being separated from the clamping seat.

Optionally, the motor rotating shaft extends out of the clamping seat; and an end portion of one of the motor rotating shaft is provided with a clamping ring to prevent the clamping seat from being separated from the motor rotating shaft.

Optionally, a limiting groove is formed in the end portion of the motor rotating shaft, and the clamping ring is arranged in the limiting groove.

Optionally, a housing clamping head is arranged around one of the impeller housings; and the housing clamping head is in threaded connection with the motor housing to connect the one of the impeller housings and the motor.

Optimally, the cross-flow type flow-making water pump further includes a base; the base is located at a bottom of the motor housing.

Optionally, the cross-flow type flow-making water pump further includes bearings coaxial with the impellers-respectively, two rotating shaft fixing seats and two rotating shafts; each of the bearings is fixedly disposed in inner side of one end of a respective one of the impellers and the one end of the respective one of the impellers-faces away from the motor; each of the rotating shaft fixing seats is arranged in an end of a respective one of the impeller housings, which faces away from the motor; and each of the rotating shafts is arranged in a respective one of the bearings in a penetrating manner; and the each of the rotating shafts extends into a respective one of the rotating shaft fixing seats.

Optionally, the cross-flow type flow-making water pump further includes a rubber pad, the rubber pad is arranged between one of the rotating shaft fixing seats and one of the impeller housings.

Optionally, the motor rotating shaft and/or the rotating shafts adopt ceramic shafts.

Optionally, each of the impellers-comprises a first impeller and a second impeller; the first impeller and the second impeller are connected into a whole through a middle turntable; the first impeller comprises a first turntable and a blade arranged between the first turntable and the middle turntable; the second impeller comprises a second turntable and a blade arranged between the second turntable and the middle turntable; an end of the first turntable, which is not connected with the blade, is provided with one of the clamping assemblies, and an end of the second turntable, which is not connected with the blade, is provided with the other one of the clamping assemblies.

Optionally, a water outlet and a water inlet are formed in a side wall of each of the impeller housings; a power line inlet and an air inlet are formed in the motor housing; a gas channel communicated with the air inlet is arranged inside the motor housing; and both ends of the gas channel are respectively communicated with the two impeller housings arranged at both ends of the motor.

Optionally, the cross-flow type flow-making water pump further includes two ventilating pipes, both ends of the gas channel are respectively connected with the two ventilating pipes.

Optionally, one of the ventilating pipes is arranged at an inside bottom of one of the impeller housings, and a plurality of air outlets are formed in the one of the ventilating pipes.

Optimally, the cross-flow type flow-making water pump further includes: a water outlet and a water inlet, formed in a side wall of one of the impeller housings; a power line inlet and an air inlet, formed in the motor housing ceramic shaft fixing seats, one of the ceramic shaft fixing seats is arranged in an end of one of the impeller housings, which is not connected with the motor; ceramic shafts, one of the ceramic shafts is arranged in the one of the ceramic shaft fixing seats in a penetrating manner, a ventilating hole, wherein the ventilating hole is formed in the one of the ceramic shafts along an axial direction of the one of the ceramic shafts; a first end of the ventilating hole is connected with the air inlet, and a second end of the ventilating hole is communicated with a cavity formed by a inner side wall of a respective one of the impellers.

Optionally, the ventilating hole is formed in the motor rotating shaft of the motor, and is disposed along an axial direction of the motor rotating shaft; the one end of the ventilating hole is connected with the air inlet, and the other end of the ventilating hole is communicated with the cavity formed by an inner side wall of the respective one of the impellers.

Optionally, the ventilating hole is formed in one of the ceramic shafts, and is disposed along an axial direction of the one of the ceramic shafts.

Optionally, the ventilating hole is formed in an end of one of the impeller housings, which is far away from the motor.

Optionally, the air inlet is connected with the ventilating hole through an air guide pipe; a gas channel is arranged in the motor housing a first end of the gas channel is connected with the air inlet, and a second end of the gas channel is connected with one of the air guide pipes.

Optionally, motor shaft sleeves are arranged around the motor rotating shaft in a sleeving manner; a first air guide hole is formed in one of the motor shaft sleeves; and the first air guide hole is communicated with the ventilating hole formed along the axial direction of the motor rotating shaft.

Optionally, a second air guide hole is formed in a radial direction of the motor rotating shaft, and the second air guide hole is communicated with the first air guide hole and the ventilating hole respectively.

Optionally, the cross-flow type flow-making water pump further includes a solar panel and a storage battery; the storage battery is connected with the solar panel and the motor respectively.

Optionally, inner sides of the ends of the impellers, which are far away from the motor, are provided with clamping heads. The ceramic shafts extend into the clamping heads. Furthermore, bearings coaxial with the impellers are further arranged in the clamping heads. The bearings are arranged around the ceramic shafts in a sleeving manner.

The present disclosure further provides a cross-flow type flow-making water pump which has dual functions of flow-making and oxygen enrichment and also solves the problem that too many pipes in an aquarium affect the aesthetic sense in the aquarium.

A cross-flow type flow-making water pump includes: a motor housing; a motor arranged inside the motor housing; two impeller housings; two impellers respectively arranged at both ends of the motor and respectively located inside the two impeller housings; and clamping assemblies for connecting the motor with the impellers, a water outlet and a water inlet are respectively formed in side walls of the impeller housings. A power line inlet and an air inlet are further formed in the motor housing. A gas channel is arranged inside the motor housing. The gas channel is communicated with the air inlet. Both ends of the air channel are respectively communicated with the impeller housings.

Optionally, both ends of the gas channel are respectively connected with ventilating pipes.

Optionally, the ventilating pipes are arranged at inside bottoms of the impeller housings, and a plurality of air outlets are formed in the ventilating pipes.

Optimally, the clamping assemblies include clamping heads. The clamping heads include at least two clamping sheets symmetrically arranged along axial directions of the impellers. Clamping seats are further arranged around motor rotating shaft in a sleeving manner. Connection between the motor rotating shaft and the impellers is realized through clamping of the clamping sheets and the clamping seats.

Rotating shaft fixing seats are arranged in the ends of the impeller housings which are far away from the motor. Rotating shafts are arranged in the rotating shaft fixing seats in a penetrating manner. The rotating shafts extend into the clamping heads. Bearings coaxial with the impellers are further arranged in the clamping heads. The bearings are arranged around the rotating shafts in a sleeving manner.

Optionally, insertion grooves are formed in the peripheries of the clamping seats along the axial directions of the clamping seats, and the clamping sheets are inserted into the insertion grooves.

Optionally, the end portions of the clamping sheets are provided with clamping hooks extending in an inward manner along radial directions of the impellers to prevent the clamping sheets from being separated from the clamping seats.

Optionally, the motor rotating shaft extends out of the clamping seats. The end portions of the motor rotating shaft are provided with clamping rings to prevent from the clamping seats being separated from the motor rotating shaft.

Optionally, limiting grooves are formed in the end portions of the motor rotating shaft, and the clamping rings are arranged in the limiting grooves.

Optionally, housing clamping heads are arranged on the impeller housings. The housing clamping heads are in threaded connection with the motor housing to realize connection between the impeller housings and the motor.

Optionally, each of the impellers includes a first impeller and a second impeller. The first impeller and the second impeller are connected into a whole through a middle turntable. The first impeller includes a first turntable and a blade arranged between the first turntable and the middle turntable. The second impeller includes a second turntable and a blade arranged between the second turntable and the middle turntable. An end of the first turntable which is not connected with the blade, is provided with the clamping assembly, and an end of the second turntable which is not connected with the blade, is also provided with the clamping assembly.

Optimally, the cross-flow type flow-making water pump further includes a base. The base is located at the bottom of the motor housing. The base is a magnetic suction disk.

The present disclosure further provides a cross-flow type flow-making water pump which solves the problem that only a small amount of filled oxygen is dissolved in water in the related art.

A cross-flow type flow-making water pump includes: a motor housing; a motor arranged inside the motor housing; two impeller housings; and two impellers respectively arranged at both ends of the motor and respectively located inside the two impeller housings. Water outlets and water inlets are respectively formed in the side walls of the impeller housings. A power line inlet and an air inlet are further formed in the motor housing. Ceramic shaft fixing seats are arranged in the ends of the impeller housings which are not connected with the motor. Ceramic shafts are arranged in the ceramic shaft fixing seats in a penetrating manner. Ventilating holes are further formed. First ends of the ventilating holes are connected with the air inlet, and second ends of the ventilating holes are communicated with cavities formed by the inner side walls of the impellers.

Optionally, the ventilating holes are formed in the motor rotating shaft of the motor, and the ventilation holes are disposed along the axial direction of the motor rotating shaft. One end of each ventilating hole is connected with the air inlet, and the other end of the ventilating holes are communicated with the cavities formed by the inner side walls of the impellers.

Optionally, the ventilating holes are formed in the ceramic shafts, and the ventilating holes are respectively disposed along the axial directions of the ceramic shafts.

Optionally, the ventilating holes are formed in the ends of the impeller housings, which are far away from the motor.

Optionally, rubber pads are arranged between the ceramic shaft fixing seats and the impeller housings. Ventilating holes are formed in the ends, which are far away from the impellers, of the rubber pads. Furthermore, the ventilating holes are circumferentially and uniformly distributed on the rubber pads. The central axial lines of the ventilating holes are parallel to those of the impeller housings.

Optionally, the air inlet is connected with the ventilating holes through air guide pipes. A gas channel is further arranged in the motor housing. A first end of the gas channel is connected with the air inlet, and a second end of the gas channel is connected with the air guide pipes.

Optionally, motor shaft sleeves are arranged on the motor rotating shaft in a sleeving manner. First air guide holes are formed in the motor shaft sleeves. The first air guide holes are communicated with the ventilating holes formed along the axial direction of the motor rotating shaft.

Optionally, second air guide holes are formed in the radial directions of the motor rotating shaft, and the second air guide holes are communicated with the first air guide holes and the ventilating holes respectively.

Optionally, the cross-flow type flow-making water pump further includes a solar panel and a storage battery. The storage battery is connected with the solar panel and the motor respectively.

Optionally, the cross-flow type flow-making water pump further includes clamping assemblies for connecting the motor with the impellers. The clamping assemblies are respectively arranged at both ends of the impellers. The clamping assemblies include clamping heads. The clamping heads include at least two clamping sheets symmetrically arranged along the axial directions of the impellers. Clamping seats are further arranged on the motor rotating shaft of the motor in a sleeving manner. Connection between output ends of the motor rotating shaft of the motor and the impellers is realized through clamping of the clamping sheets and the clamping seats.

Ceramic shafts are arranged in the ceramic shaft fixing seats in a penetrating manner. The ceramic shafts extend into the clamping heads. Furthermore, bearings coaxial with the impellers are further arranged in the clamping heads. The bearings are arranged on the ceramic shafts in a sleeving manner.

Optionally, insertion grooves are formed in the peripheries of the clamping seats along the axial directions of the clamping seats, and the clamping sheets are inserted into the insertion grooves.

Optionally, the end portions of the clamping sheets are provided with clamping hooks extending in an inward manner along radial directions of the impellers to prevent the clamping sheets from being separated from the clamping seats.

Optionally, the motor rotating shaft extends out of the clamping seats. The end portions of the motor rotating shaft are provided with clamping rings to prevent the motor rotating shaft of the motor from being separated from the clamping seats.

Optionally, limiting grooves are formed in the end portions of the motor rotating shaft, and the clamping rings are arranged in the limiting grooves.

Optionally, housing clamping heads are arranged on the impeller housings. The housing clamping heads are in threaded connection with the motor housing to realize connection between the impeller housings and the motor.

The cross-flow type flow-making water pump provided by the present disclosure realizes the connection between motor output shaft and the impellers through the connection between the clamping heads having the clamping sheets and the clamping seats, and avoids direct connection between the motor output shaft and the impellers, thereby reducing contact wear and effectively guaranteeing the rotation stabilities of the impellers. According to the cross-flow type flow-making water pump provided by the present disclosure, the gas channel is arranged inside the motor housing and the air inlet is arranged outside the motor, and meanwhile, the air inlet is communicated with the gas channel, and both ends of the gas channel are also communicated with the impeller housings, so that oxygen in air that enters from the air inlet may be dissolved in water, and then is dispersed in different water layers of the aquarium along with water flows. The impellers rotate to drive air flows to suck the air from a suction opening, and the air moves from a low-pressure region to a high-pressure region along with diversion of the water, and then is thrown out of the water pump together with the water flows, so that the water in the aquarium is enriched with oxygen while a flow-making mode is formed.

Through the arrangement of the clamping assemblies at both ends of the impellers, left and right installation ends are not required to be distinguished in an installation process of the impellers. Meanwhile, only one mold is needed to manufacture required impeller components in a manufacturing process of the impellers.

According to the cross-flow type flow-making water pump provided by the present disclosure, the ventilating holes are formed in the water pump, and the ventilating holes are communicated with the cavities formed by the inner side walls of the impellers, so that the air (oxygen) may enter the cavities formed by the inner side walls of the impellers to enable the oxygen to be mixed with the water in the inner side cavities of the impellers. Although the oxygen will be dispersed to the outer sides of the impellers along with the water, a part of the oxygen has been mixed with the water in the cavities formed by the inner side walls of the impellers, and the oxygen dispersed to the outer sides of the impellers rotates along with the impellers and is mixed with the water, so that more fed oxygen can be dissolved in the water. Therefore, the flow-making pump can increase the dissolved oxygen content in water, thereby increasing the amount of the oxygen dissolved in the water. This structure can enable oxygen-enriched bubbles to be smaller and more uniform and produce more bubbles, and is better in oxygen enrichment effect.

1: motor; 1-1: motor rotating shaft; 2: impeller; 21: first impeller; 22: second impeller; 23: middle turntable; 24: first turntable; 25: second turntable; 3: clamping head; 31: clamping sheet; 32: clamping hook; 4: clamping seat; 41: insertion groove; 5: clamping ring; 6: impeller housing; 61: housing clamping head; 7: rotating shaft fixing seat; 8: bearing; 9: rotating shaft; 10: rubber pad; 11: limiting groove; 12: motor housing; 13: base; 14: power line inlet; 15: air inlet; 16: gas channel; 17: ventilating pip; 171: air outlet; 1-2: second air guide hole; 305: air guide pipe; 308: ceramic shaft fixing seat; 309: ceramic shaft; 315: ventilating hole; 316: motor shaft sleeve; 316-1: first air guide hole; and 317: rotor.

DETAILED DESCRIPTION

For making those skilled in the art better understand technical solutions of the present disclosure, the technical solutions of the present disclosure are described below through specific embodiments in combination with drawings.

Figure 1:
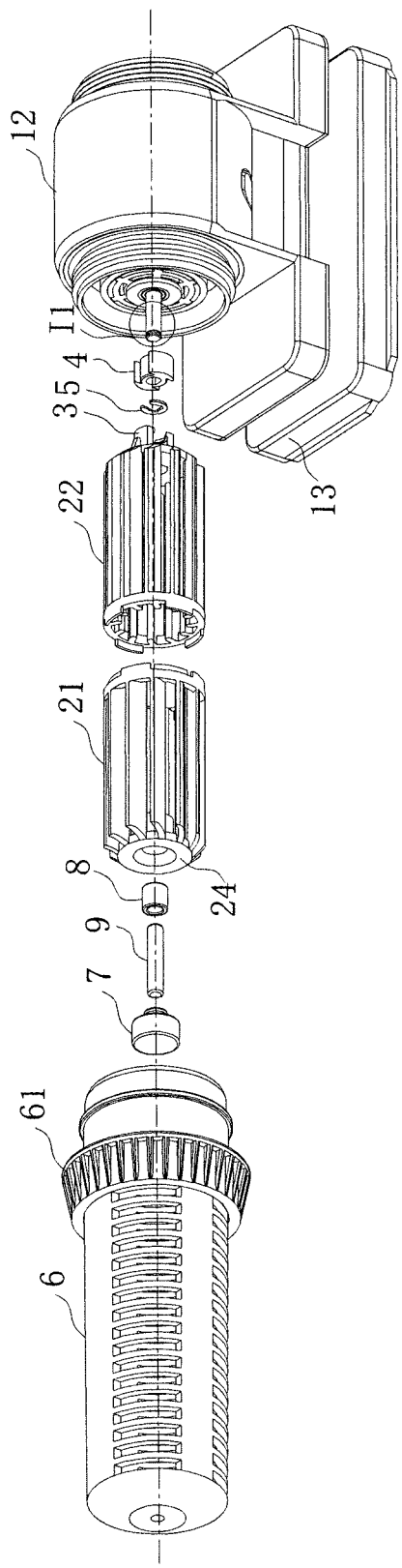
FIG. 1 is a partial structural exploded schematic diagram illustrating a cross-flow type flow-making water pump provided by the present disclosure.
Figure 2:
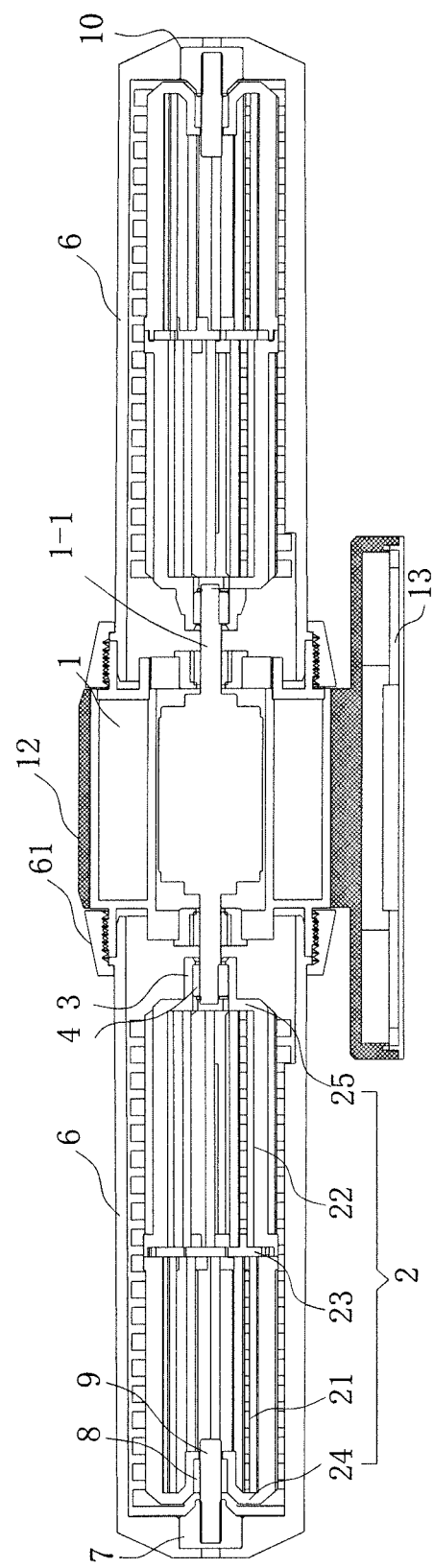
FIG. 2 is a sectional view illustrating a cross-flow type flow-making water pump provided by the present disclosure.
Figure 3:
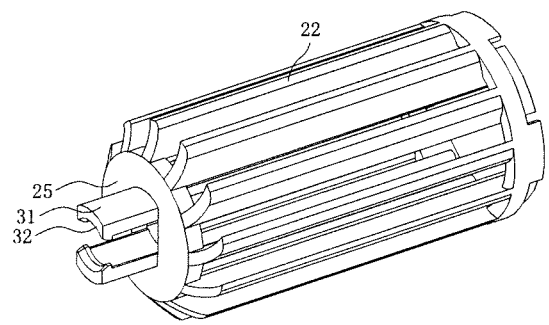
FIG. 3 is a structural enlarged view illustrating a second impeller in FIG. 1.

The present embodiment provides a cross-flow type flow-making water pump, as shown in FIG. 1, FIG. 2 and FIG. 3, including: a motor 1, two impellers 2 respectively arranged at both ends of the motor 1, two impeller housings 6 respectively arranged at both ends of the motor 1, and clamping assemblies for connecting the motor 1 with the impellers 2. The clamping assemblies include clamping heads 3 and clamping seats 4. The clamping heads 3 are arranged at the ends of the impellers 2, which are connected with motor rotating shaft 1-1. The clamping heads 3 include two clamping sheets 31 symmetrically arranged along a axial direction of the two impellers 2 (namely, the clamping sheets 31 and the impellers 2 are coaxially arranged). The clamping seats 4 are arranged on the motor rotating shaft 1-1 in a sleeving manner. Connection between the motor rotating shaft 1-1 and the impellers 2 is realized through clamping of the clamping sheets 31 and the clamping seats 4.

The present embodiment realizes the connection between the motor rotating shaft 1-1 and the impellers 2 through the connection between the clamping heads 3 having the clamping sheets 31 and the clamping seats 4, and avoids direct connection between the motor rotating shaft 1-1 and the impellers 2, thereby reducing contact wear and effectively guaranteeing the rotation stability of the impellers 2, so as to guarantee a flow-making effect. The clamping assemblies are used for connecting the motor with the impellers, so that assembling and disassembling are also facilitated, and the defect of inconvenience in assembling and disassembling due to adhesion between the motor shafts and the impellers in the related art is overcome.

In the present embodiment, the two clamping sheets 31 are clamped at peripheries of the clamping seats 4 to realize clamping of the clamping heads 3 and the clamping seats 4. In other embodiments, the two clamping sheets 31 may also be clamped in inner holes of the clamping seats 4 to realize the clamping of the clamping heads 3 and the clamping seats 4. The number of the clamping sheets 31 may be two, three or more. When three or more clamping sheets are arranged, the clamping sheets are annularly and uniformly distributed at end portions of the impellers along a axial direction of the impellers 2, and the number of insertion grooves 41 corresponding to the clamping sheets 31 should be consistent with the number of the clamping sheets 31.

As shown in FIG. 1 and FIG. 2, in the present embodiment, each of the impellers 2 includes a first impeller 21 and a second impeller 22. The first impeller 21 includes a first turntable 24 and a blade arranged between the first turntable 24 and a middle turntable 23. The second impeller 22 includes a second turntable 25 and a blade arranged between the second turntable 25 and another middle turntable 23. At least two middle turntables 23 are disposed. The first impeller 21 and the second impeller 22 becomes a whole through inserting into the two middle turntables 23. An end of the first turntable 24, which is not connected with the blade, is provided with one of the clamping assemblies, and an end of the second turntable 25, which is not connected with the blade, is also provided with one of the clamping assemblies.

In the present embodiment, the clamping heads 3 are arranged on the second turntables 25 in a protruding manner, and are symmetrically disposed along the axial direction of the impellers 2.

Figure 4:
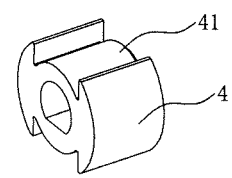
FIG. 4 is a structural enlarged view illustrating a clamping seat in FIG. 1.

Optionally, as shown in FIG. 2 and FIG. 4, the insertion grooves 41 are formed in the peripheries of the clamping seats 4 along the axial directions of the clamping seats 4. The clamping sheets 31 are inserted into the insertion grooves 41. Through the arrangement of the insertion grooves 41, the clamping sheets 31 are inserted into the insertion grooves 41 to prevent radial deviations of the impellers 2 in a rotating process and improve the rotation stability of the impellers 2.

Optionally, as shown in FIG. 3, the end portions of the clamping sheets 31 are provided with clamping hooks 32 extending in an inward manner along radial directions of the impellers 2 to prevent the clamping sheets 31 from being separated from the clamping seats 4. Through the design, axial deviations of the impellers 2 can be prevented in the rotating process, and the rotation stability of the impellers 2 is improved.

Figure 5:
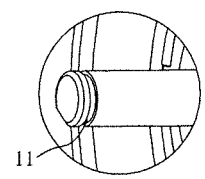
FIG. 5 is an enlarged schematic diagram illustrating a position I1 in FIG. 1.

Optionally, as shown in FIG. 2 and FIG. 5, where FIG. 5 is an enlarged schematic diagram illustrating a position I1 in FIG. 1, the motor rotating shaft 1-1 extends out of the clamping seats 4. The end portions of the motor rotating shaft 1-1 are provided with clamping rings 5 to prevent the clamping seats 4 from being separated from the motor rotating shaft 1-1. Through the design, on one hand, the connection reliability of the motor rotating shaft 1-1 and the clamping seats 4 can be guaranteed, and on the other hand, assembling and disassembling by a user can be also facilitated. As an optional solution of the present disclosure, the clamping seats 4 can be adhered with the motor rotating shaft 1-1, and the connection reliability can be guaranteed. In the present embodiment, limiting grooves 11 are formed in the end portions of the motor rotating shaft 1-1. The clamping rings 5 are arranged in the limiting grooves 11.

As shown in FIG. 1 and FIG. 2, in the present embodiment, the inner sides of the ends of the impellers 2, which are far away from the motor 1, are fixedly provided with bearings 8 coaxial with the impellers 2. Rotating shaft fixing seats 7 are arranged in the ends of the impeller housings 6, which are far away from the motor 1. Rotating shafts 9 are arranged in the bearings 8 in a penetrating manner. The rotating shafts 9 extend into the rotating shaft fixing seats 7. In the related art, the impellers 2 are fixedly connected with the rotating shafts 9, and the bearings 8 are fixedly arranged in the impeller housings 6. During assembling, the impellers 2 need to be mounted in the impeller housings 6, and the rotating shafts 9 need to be inserted into the bearings 8, resulting in troublesome assembling and low mounting speed. Meanwhile, the bearings are fixedly arranged, and the rotating shafts rotate at a high speed for a long time, and the situation such as generating heat may easily occur, resulting in aging and wear. In case of the wear, the impellers may swing and cannot work in a balanced manner, and may not meet a predetermined requirement. In the present solution, the bearings 8 are fixed to the impellers 2, and the rotating shafts 9 are arranged in the bearings 8. When the impellers 2 rotate, outer rings of the bearings 8 rotate along with the impellers 2, and the rotating shafts 9 and inner rings of the bearings 8 are static. This rotating mode can effectively reduce the wear of the rotating shafts. Moreover, during assembling, the rotating shafts 9 and the bearings 8 may be preassembled at first, and then are integrally mounted in the impeller housings 6, thereby providing convenience for assembling.

Optionally, in the present embodiment, the bearings 8 are arranged in the first turntables 24. Optionally, the first turntables 24 are provided with inward chamfers to facilitate the assembling.

Optionally, rubber pads 10 are arranged between the rotating shaft fixing seats 7 and the impeller housings 6. Through the design, the influence on the impeller housings 6 due to the rotation of the impellers 2 can be effectively reduced. Meanwhile, the balance of the impellers 2 is guaranteed, and noise is effectively reduced.

Optionally, the motor rotating shaft 1-1 and the rotating shafts 9 adopt ceramic shafts.

As shown in FIG. 1 and FIG. 2, in the present embodiment, housing clamping heads 61 are arranged around the impeller housings 6. A motor housing 12 is arranged outside the motor 1. The housing clamping heads 61 are in threaded connection with the motor housing 12 to realize connection between the impeller housings 6 and the motor 1. Through the design, assembling and disassembling by the user can be facilitated. Meanwhile, the motor housing 12 is arranged outside the motor 1, so that the water discharging direction of the flow-making pump can be also adjusted.

Optionally, the cross-flow type flow-making water pump also includes a base 13. The base 13 is located at a bottom of the motor housing 12.

Figure 6:
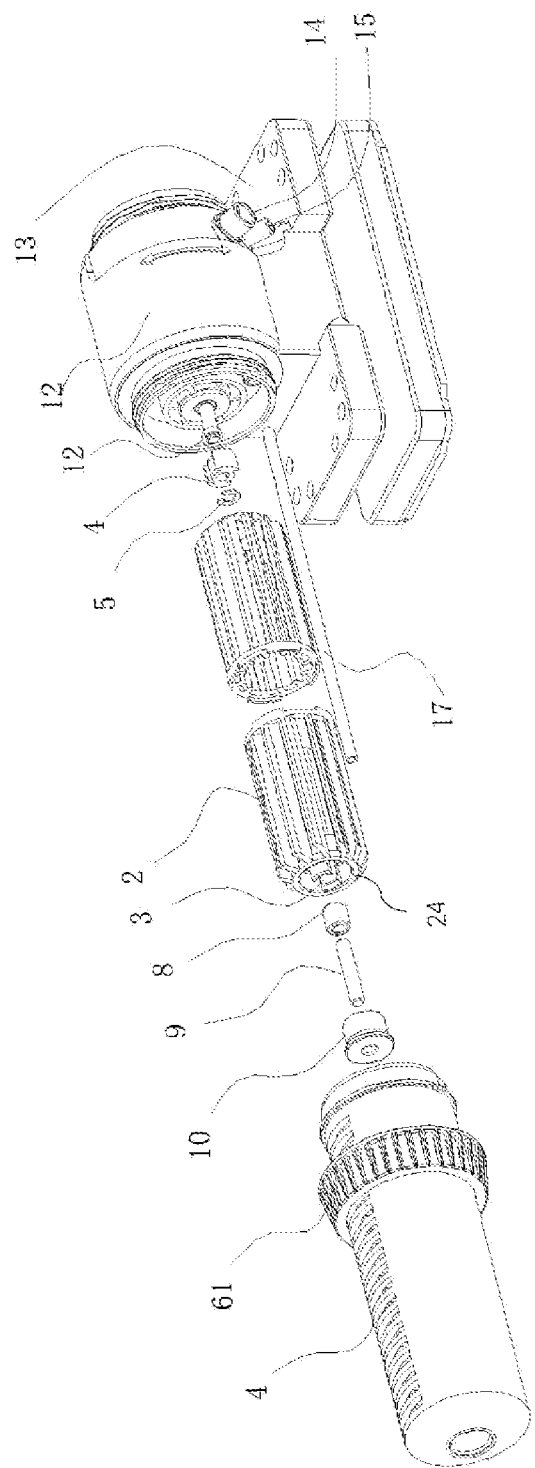
FIG. 6 is a partial structural exploded schematic diagram illustrating another cross-flow type flow-making water pump provided by the present disclosure.
Figure 7:
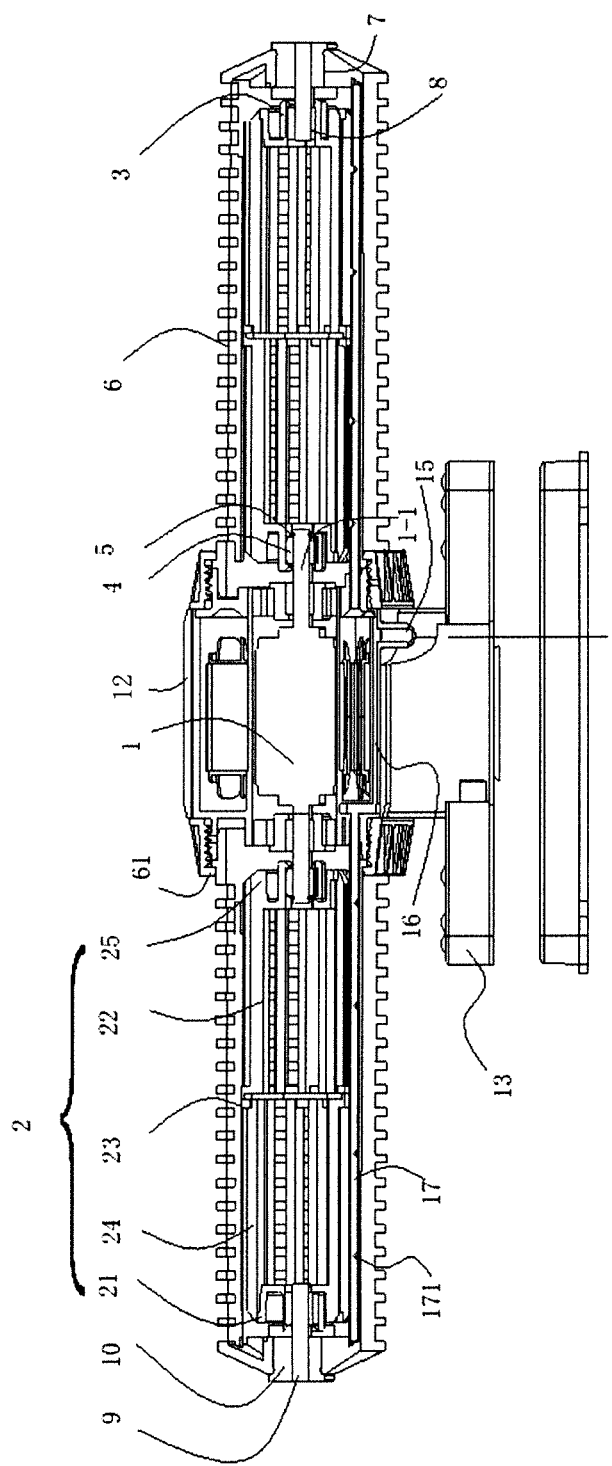
FIG. 7 is a sectional view illustrating another cross-flow type flow-making water pump provided by the present disclosure.
Figure 8:
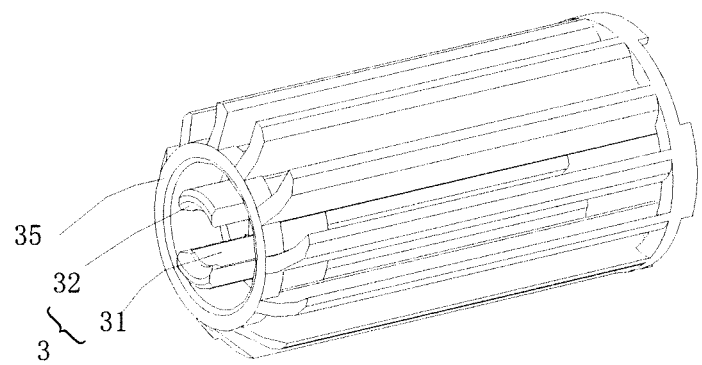
FIG. 8 is a structural enlarged diagram illustrating a first/second impeller in FIG. 6.

The present embodiment also provides another cross-flow type flow-making water pump which is varied on the basis of above embodiments. As shown in FIG. 6, FIG. 7 and FIG. 8, the cross-flow type flow-making water pump in the present embodiment may include:

a motor 1, a motor housing 12 arranged outside the motor 1, two impellers 2 respectively arranged at both ends of the motor 1, and two impeller housings 6 respectively arranged at both ends of the motor 1.

A plurality of water outlets and a plurality of water inlets are respectively formed in a side wall of each impeller housing 6. Clamping assemblies for connecting the motor 1 with the impellers 2 are also included. The clamping assemblies are respectively arranged at both ends of the impellers 2. A power line inlet 14 and an air inlet 15 are also formed in the motor housing 12. The power line inlet 14 is mainly used for enabling a power line to penetrate to prevent electric leakage caused by contact between the power line and water. A gas channel 16 communicated with the air inlet 15 is also arranged inside the motor housing 12. Both ends of the gas channel 16 are respectively communicated with the impeller housings 6. Both ends of the gas channel 16 are respectively connected with ventilating pipes 17. The ventilating pipes 17 are arranged at bottoms inside the impeller housings 6. Meanwhile, a plurality of air outlets 171 are formed in the ventilating pipes 17 to mix the oxygen in the air with the water.

As shown in FIG. 7, the air or the oxygen enters the gas channel 16 through the air inlet 15, then enters the ventilating pipes 17 through the gas channel 16, and is discharged from the air outlets 171 in the ventilating pipes 17. This structure can enable the air/oxygen to be dispersed more uniformly, so that the air/oxygen can be in contact with more water after being discharged from air discharging holes 51, and then more oxygen can be dissolved in water to increase the dissolved oxygen content in water.

The air inlet in the present embodiment can be connected with an oxygen pump to fill an aquarium with oxygen.

Optionally, as shown in FIG. 8, clamping assemblies include clamping heads 3. The clamping heads 3 include at least two clamping sheets 31 symmetrically arranged along a axial direction of the impellers 2. Moreover, the clamping seats 4 are arranged around motor rotating shaft 1-1 in a sleeving manner. The motor rotating shaft 1-1 and the impellers 2 are connected through clamping of the clamping sheets 31 and the clamping seats 4, thereby avoiding direct connection between the motor rotating shaft 1-1 and the impellers 2, reducing contact wear, effectively guaranteeing the rotation stability of the impellers 2 and guaranteeing a flow-making effect. The clamping assemblies are used for connecting the motor 1 with the impellers 2, so that assembling and disassembling are also facilitated, and the defect of inconvenience in assembling and disassembling due to adhesion between motor shafts and impellers in the related art is overcome.

Figure 9:
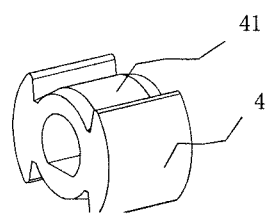
FIG. 9 is a structural enlarged diagram illustrating a clamping seat in FIG. 6.

Optionally, in the present embodiment, the two clamping sheets 31 are clamped at the peripheries of the clamping seats 4 to realize clamping of the clamping heads 3 and the clamping seats 4. In other embodiments, the two clamping sheets 31 can also be clamped in inner holes of the clamping seats 4 to realize the clamping of the clamping heads 3 and the clamping seats 4. The number of the clamping sheets 31 may be two, three or more. When three or more clamping sheets are arranged, the clamping sheets 31 are annularly and uniformly distributed at end portions of the impellers 2 along the axial direction of the impellers 2. As shown in FIG. 9, insertion grooves 41 are formed in the peripheries of the clamping seats 4 along the axial directions of the clamping seats 4. The clamping sheets 31 are inserted into the insertion grooves 41. Through the arrangement of the insertion grooves 41, radial deviations of the impellers 2 in a rotating process can be prevented, and the rotation stability of the impellers 2 are improved. Correspondingly, the end portions of the clamping sheets 31 are provided with clamping hooks 32, which are matched with the insertion grooves 41, extending in an inward manner along radial directions of the impellers 2. The clamping hooks 32 are used for preventing the clamping sheets 31 from being separated from the clamping seats 4. Through the design, axial deviations of the impellers 2 can be prevented in the rotating process, and the rotation stability of the impellers 2 is improved.

As shown in FIG. 6 and FIG. 7, in the present embodiment, each of the impeller 2 include a first impeller 21 and a second impeller 22. The first impeller 21 and the second impeller 22 are connected into a whole through a middle turntable 23. The first impeller 21 includes a first turntable 24 and a blade arranged between the first turntable 24 and the middle turntable 23. The second impeller 22 includes a second turntable 25 and a blade arranged between the second turntable 25 and the middle turntable 23. The clamping assemblies are respectively arranged at an end of the first turntable 24, which is not connected with the blade, and an end of the second turntable 25, which is not connected with the blade. The first impeller 21 and the second impeller 22 are the same in shape and size.

Through the impellers 2 with the above-mentioned shapes, only one mold is needed to complete the early-stage preparation work for the required impellers during development of an impeller mold. In a production process, stock of spare materials can be reduced. Meanwhile, in an installation process, the user does not need to distinguish the first impellers 21 from the second impellers 22, so that the installation is more convenient.

Optionally, as shown in FIG. 7, in the present embodiment, rotating shaft fixing seats 7 are arranged in the ends of the impeller housings 6, which are far away from the motor 1. Rotating shafts 9 are arranged in the rotating shaft fixing seats 7 in a penetrating manner. The rotating shafts 9 extend into the clamping heads 3. Moreover, bearings 8 coaxial with the impellers 2 are arranged in the clamping heads 3. The bearings 8 are arranged around the rotating shafts 9 in a sleeving manner. When the impellers 2 rotate, outer rings of the bearings 8 are static, and inner rings rotate along with the impellers 2. Compared with the related art, the present solution can effectively reduce wear of the rotating shafts 9 by fixing the bearings 8 to the impellers 2 and arranging the rotating shafts 9 in the bearings 8 to enable the bearings 8 and the rotating shafts 9 to rotate together during rotation of the impellers 2. In addition, during assembling, the rotating shafts 9 and the bearings 8 may be preassembled at first, and then are integrally mounted in the impeller housings 6, thereby providing convenience for assembling.

Optionally, rubber pads 10 are arranged between the rotating shaft fixing seats 7 and the impeller housings 6. Through the design, the influence on the impeller housings 6 due to the rotation of the impellers 2 can be effectively reduced. Meanwhile, the balance of the impellers 2 is guaranteed, and noise is effectively reduced.

Figure 10:
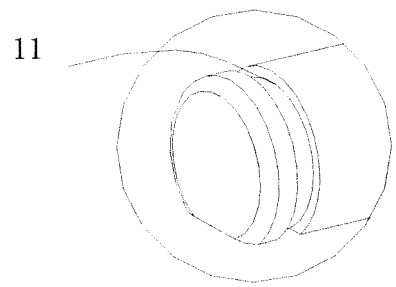
FIG. 10 is an enlarged schematic diagram illustrating a position I2 in FIG. 6.

Optionally, as shown in FIG. 10 which is an enlarged schematic diagram illustrating a position 12 in FIG. 6, the motor rotating shaft 1-1 extends out of the clamping seats 4. The end portions of the motor rotating shaft 1-1 are provided with clamping rings 5 to prevent the clamping seats 4 from being separated from the motor rotating shaft 1-1. This structure can not only guarantee relative reliable connection between the motor rotating shaft 1-1 and the clamping seats 4, but also facilitates assembling and disassembling by the user. Optionally, the limiting grooves 11 are formed in the end portions of the motor rotating shaft 1-1. The clamping rings 5 are arranged in the limiting grooves 11.

Housing clamping heads 31 are arranged on the impeller housings 6. Meanwhile, the impeller housings 6 are located at both ends of the outer side of the motor 1. The housing clamping heads 31 are in threaded connection with the motor housing 12 to realize connection between the impeller housings 6 and the motor 1. Through the design, assembling and disassembling by the user can be facilitated. Meanwhile, the motor housing 4 is arranged outside the motor 1, so that the water discharging direction of the flow-making pump can be also adjusted.

The cross-flow type flow-making water pump provided by the present embodiment may also include a base 13. The base 13 is located at the bottom of the motor housing 12. The base 13 is a magnetic suction disk.

In the present embodiment, the bearings 8 may be mounted in the first turntables 24. Optionally, the first turntables 24 are provided with inward chamfers to facilitate the assembling.

Optionally, the motor rotating shaft 1-1 and the rotating shafts 9 adopt ceramic shafts.

Figure 11:
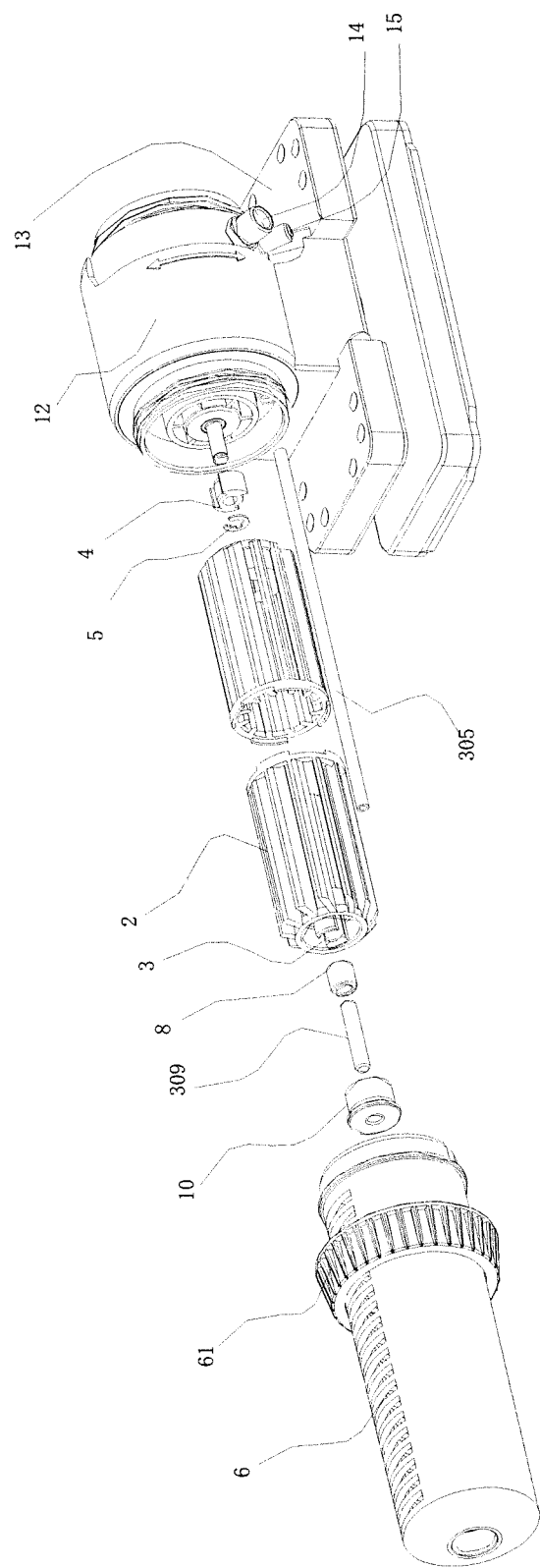
FIG. 11 is a partial structural exploded schematic diagram illustrating another cross-flow type flow-making water pump provided by the present disclosure.
Figure 12:
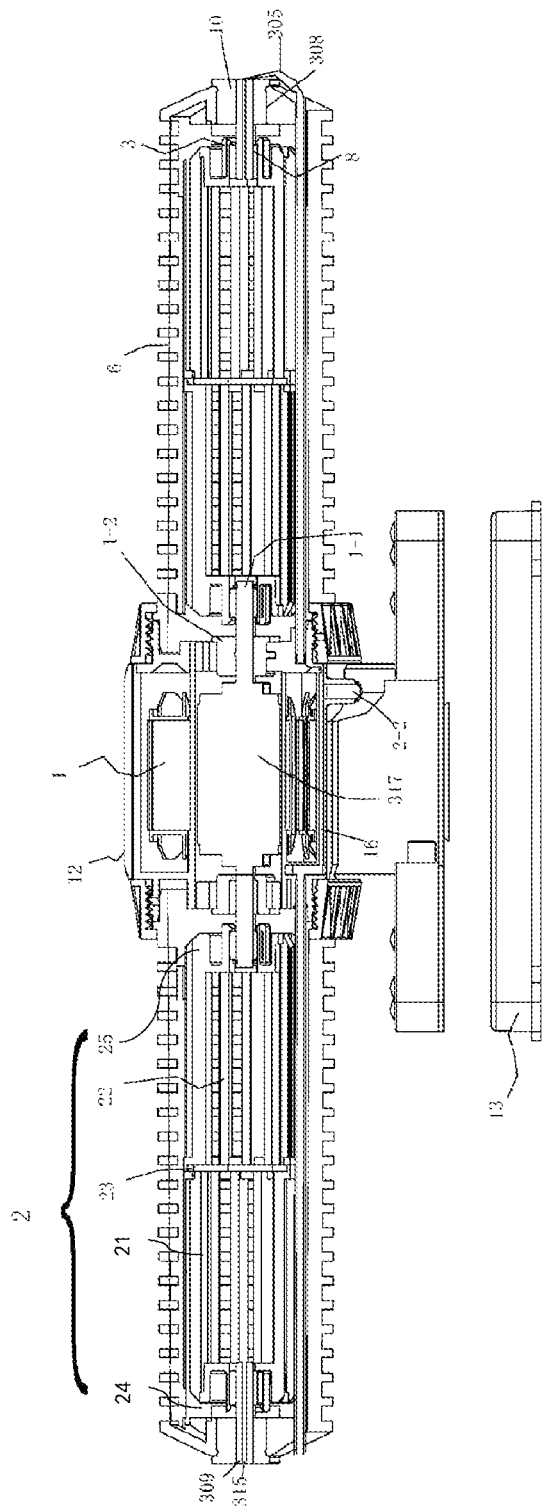
FIG. 12 is a sectional view illustrating another cross-flow type flow-making water pump provided by the present disclosure.

The present embodiment provides a cross-flow type flow-making water pump. As shown in FIG. 11 and FIG. 12, the present embodiment is varied on the basis of above embodiments. The cross-flow type flow-making water pump provided by the present embodiment may include: a motor 1, a motor housing 12 arranged on the outer side of the motor 1, impellers 2 arranged on both sides of the motor, and impeller housings 6 arranged on both sides of the motor. A plurality of water outlets and a plurality of water inlets are respectively formed in the side walls of the impeller housings 6. A power line inlet 14 and an air inlet 15 are also formed in the motor housing 12. The power line inlet 14 is mainly used for enabling a power line to penetrate to prevent electric leakage caused by contact between the power line and water. Ceramic shaft fixing seats 308 are arranged in the ends of the impeller housings 6, which are not connected with the motor 1. Ceramic shafts 309 are arranged in the ceramic shaft fixing seats 308 in a penetrating manner. A ventilating hole 315 is also formed in the water pump. The first end of the ventilating hole 315 is connected with the air inlet 15, and the second end of the ventilating hole 315 is communicated with cavities formed by the inner side walls of the impellers 2. The ventilating hole 315 may be disposed on at least one kind of the following assemblies: motor rotating shaft 1-1, the ceramic shafts 309 and the impeller housings 6. The motor rotating shaft 1-1 and a rotor 317 of the motor 1 are of an integrated structure. The motor rotating shaft 1-1 is arranged at both ends of the rotor.

This structure enables the air (the oxygen) to enter the cavities formed by the inner side walls of the impellers 2 from the ventilating holes, so that the air and the water can be better mixed in a rotating process of the impellers 2, and such a phenomenon that the air is dispersed from the outer side edges of the impellers and flows out of the water without being mixed with the water is effectively prevented. This structure can increase the air and water mixing rate, and effectively increase the oxygen content in the water.

The air inlet 15 is connected with the ventilating hole 315 through the air guide pipes 305. A gas channel 16 is also arranged inside the motor housing 12. One end of the gas channel 16 is connected with the air inlet 15, and the other end of the gas channel 16 is connected with the air guide pipes 305. When the air inlet 15 is communicated with the ceramic shafts 309, the impeller housings 6 and the rubber pads 10 through the air guide pipes 305, the air guide pipes 305 are partially located in the impeller housings 6, and are located at the bottommost ends of the impeller housings 6. The ends communicated with the ceramic shafts 309 extend out of the impeller housings 6.

In other embodiments, the portions of the air guide pipes 305, which are located inside the impeller housings 6, may be also provided with a plurality of air outlets. The air outlets are located on the side walls of the air guide pipes 305. This structure can enable the air to exist on the inner and outer sides of the impellers to improve the air and water mixing efficiency, and then more oxygen can be dissolved in the water to increase the dissolved oxygen content in the water.

Figure 13:
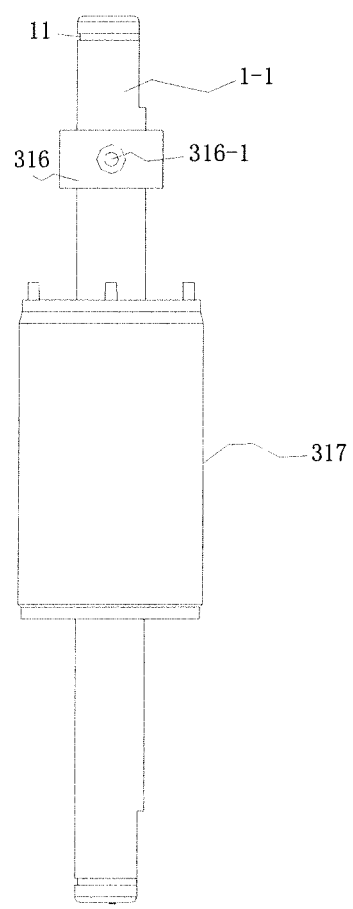
FIG. 13 is a structural schematic diagram illustrating a motor rotor in FIG. 12.
Figure 14:
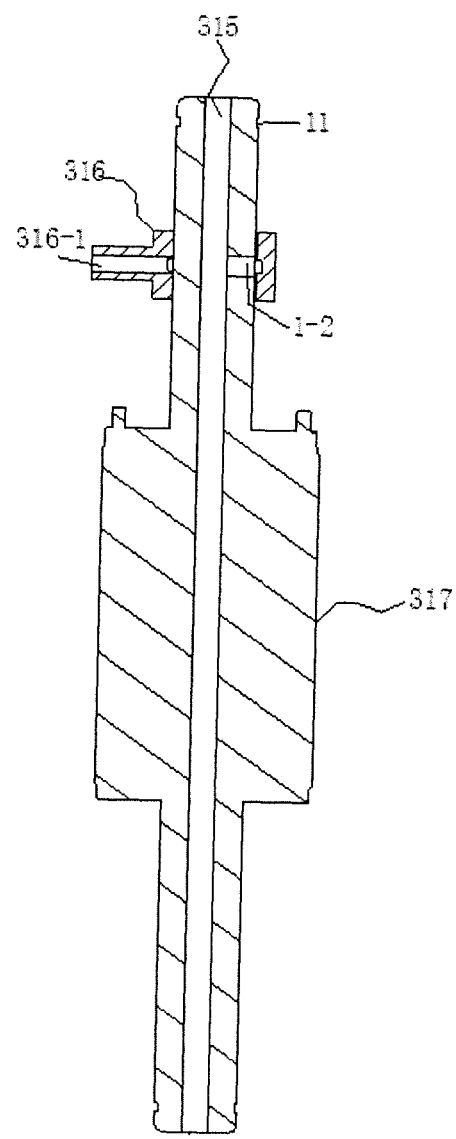
FIG. 14 is a partial sectional view illustrating a motor rotor in FIG. 13.

As shown in FIG. 13 and FIG. 14, motor shaft sleeves 316 may be arranged on the motor rotating shaft 1-1 in a sleeving manner. First air guide holes 316-1 are formed in the motor shaft sleeves 316. The first air guide holes 316-1 are communicated with the ventilating hole 315 axially formed in the motor rotating shaft 1-1. Optionally, the motor rotating shaft 1-1 is provided with second air guide holes 1-2 in radial directions. The second air guide holes 1-2 are respectively communicated with the first air guide holes 316-1 and the ventilating hole 315. The first air guide holes 316-1 and the second air guide holes 1-2 form an "L"-shaped air channel. The "L"-shaped air channel is communicated with the ventilating holes.

The above-mentioned structure can enable the air to enter both ends of the impellers at the same time, so that the air and water mixing efficiency is improved, and the oxygen content in the water is increased.

Optionally, rubber pads 10 are arranged between the ceramic shaft fixing seats 308 and the impeller housings 6 in the present embodiment. The ends of the rubber pads 10, which are far away from the impellers 2, are provided with the ventilating hole 315. The ventilating hole 315 is circumferentially and uniformly distributed in one of the rubber pads 10. Moreover, the central axial lines of gas through holes are parallel to those of the impeller housings 6.

In other embodiments, when the impeller housings are provided with air feeding holes 15, the ventilating hole 315 may be formed in an axial direction of the motor rotating shaft 1-1 and/or the ceramic shafts 309, and in the axial direction of the motor rotating shaft 1-1 and/or the ceramic shafts 309, the ventilating hole 315 may not be formed.

In present embodiment, power may be supplied to the motor 1 through a mains supply or a solar panel. When the power supply is the mains supply, a plug of the water pump is directly plugged into a socket. When the power supply is the solar panel, the motor 1 is connected with the solar panel through a storage battery. The solar panel converts solar energy into electric energy, and the storage battery stores the electric energy converted by the solar battery.

The present embodiment also may include clamping assemblies for connecting the motor 1 with the impellers. The clamping assemblies include clamping heads 3. As shown in FIG. 8, the present embodiment is the same as above embodiments. In the present embodiment, the clamping heads 3 may include at least two clamping sheets 31 symmetrically arranged along the axial direction of the impellers 2. Moreover, the clamping seats 4 are arranged around the motor rotating shaft 1-1 of the motor 1 in a sleeving manner. Connection between the output ends of the motor rotating shaft 1-1 of the motor 1 and the impellers 2 is realized through clamping of the clamping sheets 31 and the clamping seats 4, thereby avoiding direct connection between the motor rotating shaft 1-1 of the motor 1 and the impellers 2, reducing contact wear, effectively guaranteeing the rotation stability of the impellers 2 and guaranteeing a flow-making effect. The clamping assemblies are used for connecting the motor 1 with the impellers 2, so that assembling and disassembling are also facilitated, and the defect of inconvenience in assembling and disassembling due to adhesion between motor rotating shaft and impellers in the related art is overcome.

In the present embodiment, the two clamping sheets 31 are clamped at the peripheries of the clamping seats 4 to realize clamping of the clamping heads 3 and the clamping seats 4. In other embodiments, the two clamping sheets 31 may also be clamped in inner holes of the clamping seats 4 to realize the clamping of the clamping heads 3 and the clamping seats 4. The number of the clamping sheets 31 may be two, three or more. When three or more clamping sheets are arranged, the clamping sheets 31 are annularly and uniformly distributed at end portions of the impellers 2 along the axial direction of the impellers 2. As shown in FIG. 9, like above embodiments, in the present embodiment, insertion grooves 41 are formed in the peripheries of the clamping seats 4 along the axial directions of the clamping seats 4. The clamping sheets 31 are inserted into the insertion grooves 41. Through the arrangement of the insertion grooves 41, radial deviations of the impellers 2 in a rotating process can be prevented, and the rotation stability of the impellers 2 is improved. Correspondingly, the end portions of the clamping sheets 31 are provided with clamping hooks 32, which are matched with the insertion grooves 41, extending in an inward manner along radial directions of the impellers 2. The clamping hooks 32 are used for preventing the clamping sheets 31 from being separated from the clamping seats 4. Through the design, axial deviations of the impellers 2 can be prevented in the rotating process, and the rotation stability of the impellers 2 is improved.

As shown in FIG. 11 and FIG. 12, in the present embodiment, each of the impeller 2 may include a first impeller 21 and a second impeller 22. The first impeller 21 and the second impeller 22 are connected into a whole through a middle turntable 23. The first impeller 21 includes a first turntable 24 and a blade arranged between the first turntable 24 and the middle turntable 23. The second impeller 22 includes a second turntable 25 and a blade arranged between the second turntable 25 and the middle turntable 23. The clamping assemblies are respectively arranged at an end of the first turntable 24, which is not connected with the blades, and an end of the second turntable 25, which is not connected with the blade. The first impeller 21 and the second impeller 22 are the same in shape and size.

By configuring the impellers 2 into the above-mentioned shapes, only one mold is needed to complete the early-stage preparation work for the required impellers during development of an impeller mold. In a production process, stock of spare materials can be reduced. Meanwhile, in an installation process, the user does not need to distinguish the first impellers from the second impellers, so that the installation is more convenient.

Optionally, as shown in FIG. 12, in the present embodiment, ceramic shaft fixing seats 308 are arranged in the ends of the impeller housings 6, which are far away from the motor 1. Ceramic shafts 309 are arranged in the ceramic shaft fixing seats 308 in a penetrating manner. The inner sides of the ends of the impellers 2, which are far away from the motor 1, are provided with clamping heads 3. The ceramic shafts 309 extend into the clamping heads 3. In addition, bearings 8 coaxial with the impellers 2 are also arranged in the clamping heads 3. The bearings 8 are arranged around the rotating shafts 309 in a sleeving manner. When the impellers 2 rotate, outer rings of the bearings 8 are static, and inner rings rotate along with the impellers 2. Compared with the related art, the present solution can effectively reduce wear of the ceramic shafts 309 by fixing the bearings 8 to the impellers 2 and arranging the ceramic shafts 10 in the bearings 8 to enable the bearings 8 and the ceramic shafts 309 to rotate together during rotation of the impellers 2. In addition, during assembling, the ceramic shafts 309 and the bearings 8 may be preassembled at first, and then are integrally mounted in the impeller housings 6, thereby providing convenience for the assembling.

Optionally, rubber pads 10 are arranged between the ceramic shaft fixing seats 308 and the impeller housings 6. Through the design, the influence on the impeller housings 6 due to the rotation of the impellers 2 can be effectively reduced. Meanwhile, the balance of the impellers 2 is guaranteed, and noise is effectively reduced.

The motor rotating shaft 1-1 of the motor 1 extends out of the clamping seats 4. The end portions of the motor rotating shaft 1-1 of the motor 1 are provided with clamping rings 5 to prevent the clamping seats 4 from being separated from the motor rotating shaft 1-1 of the motor 1. This structure not only guarantees relative reliable connection between the motor rotating shaft 1-1 of the motor 1 and the clamping seats 4, but also facilitates assembling and disassembling by the user. Optionally, limiting grooves 11 are formed in the end portions of the motor rotating shaft 1-1 of the motor 1. The clamping rings 5 are arranged in the limiting grooves 11.

Housing clamping heads 61 are arranged around the impeller housings 6. Meanwhile, the impeller housings 6 are located at both ends of the outer side of the motor 1. The housing clamping heads 61 are in threaded connection with the motor housing 12 to realize connection between the impeller housings 6 and the motor 1. Through the design, assembling and disassembling by the user can be facilitated. Meanwhile, the motor housing 4 is arranged outside the motor 1, so that the water discharging direction of the flow-making pump can be also adjusted.

The cross-flow type flow-making water pump also includes a base 13. The base 13 is located at a bottom of the motor housing 12. The base 13 is a magnetic suction disk.

In the present embodiment, the bearings 8 are arranged in the first turntables 24. Optionally, the first turntables 214 are provided with inward chamfers to facilitate the assembling.

Optionally, the motor rotating shaft 1-1 of the motor 1 and the ceramic shafts 309 are both made of ceramic materials.

What is claimed is:

1. A cross-flow flow-making water pump, comprising:
   a motor housing;
   a motor arranged inside the motor housing;
   two impeller housings;
   two impellers, respectively arranged at both ends of the motor and respectively located inside the two impeller housings; and
   two clamping assemblies for connecting the motor with the two impellers respectively;
   wherein each of the two clamping assemblies comprise a clamping head and a clamping seat; and
   wherein the clamping head of the each of the two clamping assemblies is arranged at one end of a respective one of the two impellers, and the one end of the respective one of the two impellers is connected with a motor rotating shaft of the motor; and the clamping head of the each of the two clamping assembles comprises at least two clamping sheets symmetrically arranged along an axial direction of the two impellers; and
   the clamping seat of the each of the two clamping assemblies is arranged around a respective end portion of the motor rotating shaft in a sleeving manner, and the respective end portion of the motor rotating shaft and the respective one of the two impellers are connected through clamping between the respective at least two clamping sheets and the respective clamping seat.

2. The cross-flow flow-making water pump according to claim 1, wherein insertion grooves are formed in a periphery of the clamping seat along an axial direction of the clamping seat, and the at least two clamping sheets are inserted into the insertion grooves.

3. The cross-flow flow-making water pump according to claim 2, wherein an end portion of each of the at least two clamping sheets is provided with a clamping hook extending in an inward manner along a radial direction of the respective one of the two impellers to prevent the clamping sheets from being separated from the clamping seat.

4. The cross-flow flow-making water pump according to claim 1, wherein the respective end portion of the motor rotating shaft extends out of the clamping seat of the each of the two clamping assemblies; and the respective end portion of the motor rotating shaft is provided with a clamping ring to prevent the clamping seat from being separated from respective end portion of the motor rotating shaft.

5. The cross-flow flow-making water pump according to claim 4, wherein a respective limiting groove is formed in the respective end portion of the motor rotating shaft, and the clamping ring is arranged in the respective limiting groove.

6. The cross-flow flow-making water pump according to claim 1, wherein a housing clamping head is arranged around one of the impeller housings; and the housing clamping head is in threaded connection with the motor housing to connect the one of the impeller housings and the motor.

7. The cross-flow flow-making water pump according to claim 6, further comprising a base; wherein the base is located at a bottom of the motor housing.

8. The cross-flow flow-making water pump according to claim 1, further comprising bearings coaxial with the impellers respectively, two rotating shaft fixing seats and two rotating shafts;
wherein each of the bearings is fixedly disposed in inner side of one end of a respective one of the impellers, and the one end of the respective one of the impellers faces away from the motor; each of the rotating shaft fixing seats is arranged in an end of a respective one of the impeller housings, which faces away from the motor; and each of the rotating shafts is arranged in a respective one of the bearings in a penetrating manner; and the each of the rotating shafts extends into a respective one of the rotating shaft fixing seats.

9. The cross-flow flow-making water pump according to claim 8, further comprising a rubber pad, wherein the rubber pad is arranged between one of the rotating shaft fixing seats and one of the impeller housings.

10. The cross-flow flow-making water pump according to claim 8, wherein at least one of the motor rotating shaft and the rotating shafts adopts ceramic shaft.

11. The cross-flow flow-making water pump according to claim 1, wherein each of the two impellers comprises a first impeller and a second impeller; the first impeller and the second impeller are connected into a whole through a middle turntable; the first impeller comprises a first turntable and a blade arranged between the first turntable and the middle turntable; the second impeller comprises a second turntable and a blade arranged between the second turntable and the middle turntable; an end of the first turntable, which is not connected with the blade, is provided with a third clamping assembly, and an end of the second turntable, which is not connected with the blade, is provided with a respective one of the two clamping assemblies.

12. The cross-flow flow-making water pump according to claim 1, wherein
a water outlet and a water inlet are formed in a side wall of each of the impeller housings;
a power line inlet and an air inlet are formed in the motor housing; a gas channel communicated with the air inlet is arranged inside the motor housing; and both ends of the gas channel are respectively communicated with the two impeller housings arranged at both ends of the motor.

13. The cross-flow flow-making water pump according to claim 1, further comprising:
a water outlet and a water inlet, formed in a side wall of one of the impeller housings;
a power line inlet and an air inlet, formed in the motor housing two ceramic shaft fixing seats, wherein each of the two ceramic shaft fixing seats is arranged in an end of one of the impeller housings, which is not connected with the motor;
two ceramic shafts, wherein each of the two ceramic shafts is arranged in a respective one of the two ceramic shaft fixing seats in a penetrating manner, wherein
a ventilating hole, wherein the ventilating hole is formed in the one of the two ceramic shafts-along an axial direction of the one of the two ceramic shafts; a first end of the ventilating hole is connected with the air inlet, and a second end of the ventilating hole is communicated with a cavity formed by an inner side wall of a respective one of the impellers.

\* \* \* \* \*